(12) United States Patent
Baumoel

(10) Patent No.: US 6,681,641 B2
(45) Date of Patent: Jan. 27, 2004

(54) CLAMP-ON GAS FLOWMETER

(76) Inventor: Joseph Baumoel, 104 Fairway View Dr., Commack, NY (US) 11725

( * ) Notice: Subject to any disclaimer, the term of this patent is extended or adjusted under 35 U.S.C. 154(b) by 0 days.

(21) Appl. No.: 09/949,590

(22) Filed: Sep. 10, 2001

(65) Prior Publication Data

US 2003/0047007 A1 Mar. 13, 2003

(51) Int. Cl.⁷ .................................................. G01F 1/66
(52) U.S. Cl. .................................................. 73/861.27
(58) Field of Search ........................... 73/861.27, 861.29, 73/861.31, 861.18, 204.21, 194, 861.357, 861.356

(56) References Cited

U.S. PATENT DOCUMENTS 4,003,252 A * 1/1977 Dewath .................... 73/861.27
5,220,830 A * 6/1993 Bonne ........................ 73/198
6,065,350 A * 5/2000 Hill et al. ................. 73/861.27
6,301,973 B1 * 10/2001 Smith ....................... 73/861.27
6,375,651 B2 * 4/2002 Grasso et al. ................ 606/15

* cited by examiner

Primary Examiner—Edward Lefkowitz
Assistant Examiner—Jewel V. Thompson
(74) Attorney, Agent, or Firm—F. Chau & Associates, LLP

(57) ABSTRACT

Disclosed is a gas flowmeter comprising a transmit transducer for injecting sonic energy into gas; a receive transducer for receiving the sonic energy; and a spool of pipe having a metallic pipe wall and a liner having a lower sonic impedance than the sonic impedance of the metallic pipe wall, wherein the transmit and receive transducers are mounted on the spool.

18 Claims, 8 Drawing Sheets

CLAMP ON GAS SPOOL

CLAMP ON GAS SPOOL

FIG. 7 EFFECTS OF FLOW RATE ON SONIC BEAM ENERGY PATH

PIPE WALL AND GAS SIGNAL PATH

CLAMP-ON GAS FLOWMETER

BACKGROUND OF THE INVENTION

1. Technical Field

This invention is directed to a method and device for measuring flow rate of gas; in particular, a device and method for measuring gas flow in a pipe using a non-intrusive clamp-on flowmeter.

2. Description of Related Art

Transit-time ultrasonic Gas flowmeters are well known. FIG. 1 shows a conventional gas flowmeter wherein transducers are introduced directly into the gas via holes in the pipe wall. Since the pressure within the pipe is usually quite high, typically from several atmospheres to many hundreds of atmospheres, it is necessary to use a pressure seal around the transducers to prevent the escape of gas. Since the transducer itself must also withstand the pressure it must necessarily be rigid and of high density. Because sonic impedance is directly related to material density, i.e., Zs=material density times its sonic propagation velocity, the transducer/pipe interface presents a high sonic impedance, which is a mismatch to the low sonic impedance of gas. Accordingly, the efficiency of introducing sonic energy into gas is low. To overcome this inefficiency it is necessary to generate a substantial impulse at the emission surface of the transmit transducer 100. This results in substantial energy in the transducer body that would preferentially enter the pipe wall of pipe 120 to which it is attached, via the pressure seal, since the high impedance of the transducer matches the impedance of the pipe wall.

Once this energy enters the pipe wall it will pass directly to the receive transducer 110 through the pipe wall. As compared to the gas signal amplitude received at the receive transducer 110, the amplitude of the transmit energy is much higher, and the residence time in the pipe of the transmit energy is lengthy, as it reverberates between pipe wall discontinuities. Thus the much smaller gas receive signal amplitude is obscured. This makes detection of the effect of flow on the transit-time of the received gas signal difficult or impossible due to low signal to noise ratio.

In one solution, the inserted gas transducer is equipped with an internal means of dissipating the sonic energy not transmitted into the gas before it reaches the location of the transducer to pipe wall pressure seal. A combination of metallic and viscous elastomeric elements can be used to dissipate the sonic energy. The signal to noise ratio of hundreds to one, or even greater, can be achieved.

Generally, the operation of the conventional transit-time flowmeter includes a flow computer which by digitizing the received signal computes flow from the measured difference in upstream versus downstream transit-time, and the absolute measured transit-time, using well-known algorithms.

With the conventional transit-time flowmeter, a problem develops at high flow rates due to the fixed positions of the insert transducers in the pipe wall. The problem arises when the searchlight like "narrow" beam width is generated and injected into the flow path of the gas. Since the flow rate of gas can reach a high percentage of the propagation velocity of the gas itself, it can be appreciated that under these conditions, "blowing" of the sonic beam downstream from both the upstream and downstream transducers can result. FIG. 2 illustrates such phenomenon. The normal beam transmitted from the transmit transducer 100 is "blown" downstream by the gas flow and the intended signal is not received by the receive transducer 110. Thus, there is no position to place either transducer that will avoid the possibility of having the sonic beam miss either or both, except perhaps to mount them axially in-line. This results however in the upstream transducer affecting the flow profile and even altering the apparent velocity of the sonic beam in the path between transducers.

It is well known that clamp-on liquid flowmeters produce highly accurate measurements. One important difference in the circumstances that affect gas versus liquid flowmetering is the very low sonic impedance of the gas—as much as 100 times or more lower than the average liquid case. This results in a substantial reduction of the signal amplitude of the sonic energy that enters the gas medium from the pipe wall. Another difference is the significantly lower sonic propagation velocity of gas as compared to a typical liquid—about one-fifth of typical liquid velocity. This lower propagation velocity also results in a much larger refraction angle by which sonic energy emerges from the pipe wall to enter the gas, relative to that for liquid. FIG. 3 illustrates the differences in refraction angles for gas and liquids. The gas sonic velocity is about 12,000 inches/second, while the liquid sonic velocity is about 60,000 inches/second, whereas the pipe wall sonic velocity is about 115,000 inches/second. This results in an angle from the normal of about 6 degrees for gas, versus as much as 26 degrees for liquid. This means that the sensitivity of flow detection is much smaller for gas than for liquid, in the ratio of the sine of these angles. However, the considerably higher flow rates common for gas as compared to liquid conveniently compensate for this fact.

In the conventional intrusive ultrasonic gas flowmeter, the design of the transducers prevents the entry of sonic energy into the pipe wall. But in the case of a clamp-on gas meter, it is essential to introduce a substantial sonic signal into the pipe wall, since it is the actual source of the sonic energy that enters the gas medium. Accordingly, a solution is to dissipate the remaining pipe wall sonic energy, the source of the gas signal, before the gas signal completes its path to the receive transducer through the gas. Fortunately, the velocity through the gas is very slow compared to the very high velocity of the sonic energy in the pipe wall. The typical ratio of these velocities is about 10:1.

If the transducers are clamped to an installed pipe which is very long between pipe wall discontinuities, such as flanges, then the transmit signal in the pipe wall will "leave the vicinity" and be absorbed, in the main, before it reflects from these flanges and obscure the very small gas signal. FIG. 4A shows reflection characteristics of noise amplitude versus distance of a direct wave in a spool. FIG. 4B shows reflection characteristics of undamped and a damped spool. FIG. 4C shows reflection characteristics of noise amplitude versus time of a direct wave. FIG. 4D shows reflection characteristics of noise amplitude versus time of an undamped and a damped spool. It can be seen that if the section of pipe is small, then an echo chamber is formed, and the original transmit sonic energy will be present at the location of the receive transducer when the gas signal arrives. Accordingly, for field mounted clamp-on gas flowmeters, it is recommended that the section of pipe on which the transducers are installed be long between discontinuities. The actual length required to obtain a designated level of performance, limited by signal to noise ratio, is shorter for higher pressure gas, which higher pressure serves to increase the amplitude of the gas signal.

But, since proving the calibration of a gas meter in the field is difficult at best, and is usually a practical impossibility, it is desired to fabricate a gas meter in the form of a spool. This permits it to be taken to a laboratory for calibration. But if it is necessary to make the spool long, as noted above, then this length makes it impractical to fabricate, calibrate, transport and install. Accordingly, it is desired to make the gas spool short. To accomplish this it is essential that a means be developed to dissipate the transmit sonic energy well before the gas signal arrives at the receive transducer.

SUMMARY OF THE INVENTION

A method and a device are provided for enabling the measurement of the flow rate of gas by use of a non-intrusive clamp-on transit-time ultrasonic flowmeter. The device and method utilize a wide beam transit-time transducer, in which its frequency matches the thickness mode and longitudinal mode resonance frequency of the pipe, and the phase velocity of the transducers matches the propagation velocity of a transverse mode wave in the direction of the axis of the pipe. These conditions assure that the sonic beam retains its shape as the emergence point from the pipe wall is moved by the higher gas flow rates, relative to the flow rate of the sonic pulse through the gas medium.

Disclosed is a means of dissipating the very high transmit sonic energy in the pipe wall so that it is smaller than the relatively low received gas signal limited by the inefficiency of introducing sonic energy from the high sonic impedance of the metallic pipe wall into the low sonic impedance of the gas. Such energy is naturally dissipated if the clamp-on transducer is mounted onto an installed gas pipe in which there is a large distance between the location of the transducers and the nearest pipe wall discontinuity, such as a flange or weld. However, if it is desired to manufacture a clamp-on gas spool, in which it is desired to limit the length of the spool, then the sonic energy will be "trapped" between these discontinuities, and continue to reverberate past the transducer location and so be present and of substantial amplitude when the gas path received sonic wave arrives, and so obscure its detection.

Also disclosed is a gas flowmeter comprising a transmit transducer for injecting sonic energy into gas; a receive transducer for receiving the sonic energy; and a spool of pipe having a metallic pipe wall and a liner having a lower sonic impedance than the sonic impedance of the metallic pipe wall, wherein the transmit and receive transducers are mounted on the spool. Accordingly, the liner acts to absorb or dissipate the high sonic energy to dramatically improve the signal to noise ratio of the device.

Preferably, the pipe includes inner and outer pipe walls and the liner is formed on the inner pipe wall surface, but the liner may also be formed on the outside of the pipe wall, or both inner and outside surfaces. The liner may be bonded to the wall of the pipe by melting liner material onto the wall of the pipe declining the temperature at a given rate. The spool of pipe includes flanges and a reducer.

In another aspect of the invention, the liner is machined to a thickness to match the sonic wave guide properties of the pipe. The receive transducer is spaced at a distance for the transmit transducer such that a sonic beam transmitting from the transmit transducer arrives at the receive transducer at the same time via the pipe wall and via refraction from an opposing pipe wall of the pipe. In a preferred embodiment of the invention, the transmit transducer and the receive transducer is mounted along the same side of the pipe.

According to an alternative embodiment according to the present invention, a gas flowmeter comprises a spool of plastic pipe for carrying gas therethrough and a plastic transmit transducer and a plastic receive transducer mounted on the spool for injecting sonic energy into the path of gas flow, wherein the sonic energy is received by the receive transducer for determining velocity of gas flow.

Also disclosed is a method for measuring gas flow comprising the steps of injecting from a transmit transducer mounted on a metallic spool of pipe sonic energy into gas flowing through the spool of pipe; and receiving the sonic energy at a receive transducer through a liner bonded to the pipe wall of the spool of pipe, the liner having a lower sonic impedance than the sonic impedance of the metallic pipe wall. The liner is preferably made from a plastic. The pipe includes inner and outer pipe walls and the liner is formed on one of the inner or outer pipe walls.

In another aspect of the invention, the liner is bonded to the wall of the pipe by melting liner material onto the wall of the pipe and continually declining the temperature at a given rate.

In a preferred embodiment of the invention, the transmit transducer is spaced from the receive transducer at a distance such that a sonic beam transmitting from the transmit transducer arrives at the receive transducer at the same time via the pipe wall and via refraction from an opposing pipe wall of the pipe. The transmit transducer and the receive transducer are mounted along the same side of the pipe.

According to another preferred embodiment of the present invention, a gas flowmeter device for measuring gas flow by injecting and receiving sonic energy through the path of gas flow, comprises a spool of pipe for passing gas flow therethrough; and interface means disposed in the pipewall of the spool for sonic impedance matching materials in the path of the sonic energy. The interface means includes a liner having a lower sonic impedance than the sonic impedance of the pipewall and the spool of pipe is metallic. Alternatively, the interface means includes a plastic transmit transducer for injecting the sonic energy and a plastic receive transducer for receiving the sonic energy, and the spool of pipe is also plastic.

DETAILED DESCRIPTION OF PREFERRED EMBODIMENTS

According to a preferred embodiment of the invention, an energy absorbent material is placed in intimate contact with either the inside or outside wall of the pipe, or both, to absorb this energy. Since even a small gap between this material and the pipe wall itself will serve to preclude energy transfer, a true "molecular" bond between this material and the pipe wall is preferred. The material has high sonic impedance to accept this energy transfer efficiently. In addition, it is capable of converting the absorbed "coherent" sonic energy into "non-coherent" mechanical energy, or heat.

Figure 1:
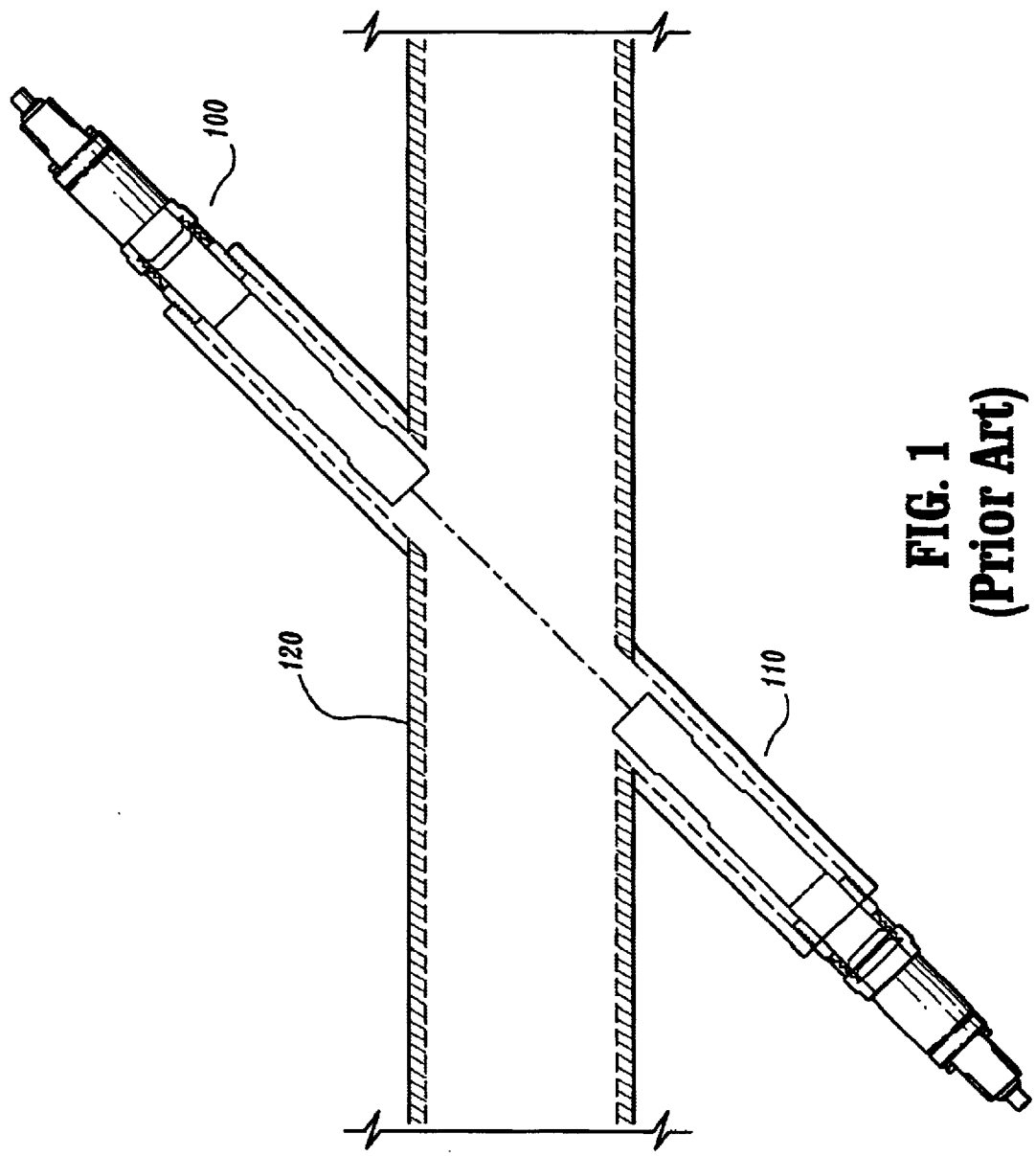
FIG. 1 shows a conventional transmit and receive transducer installed in a pipe.
Figure 2:
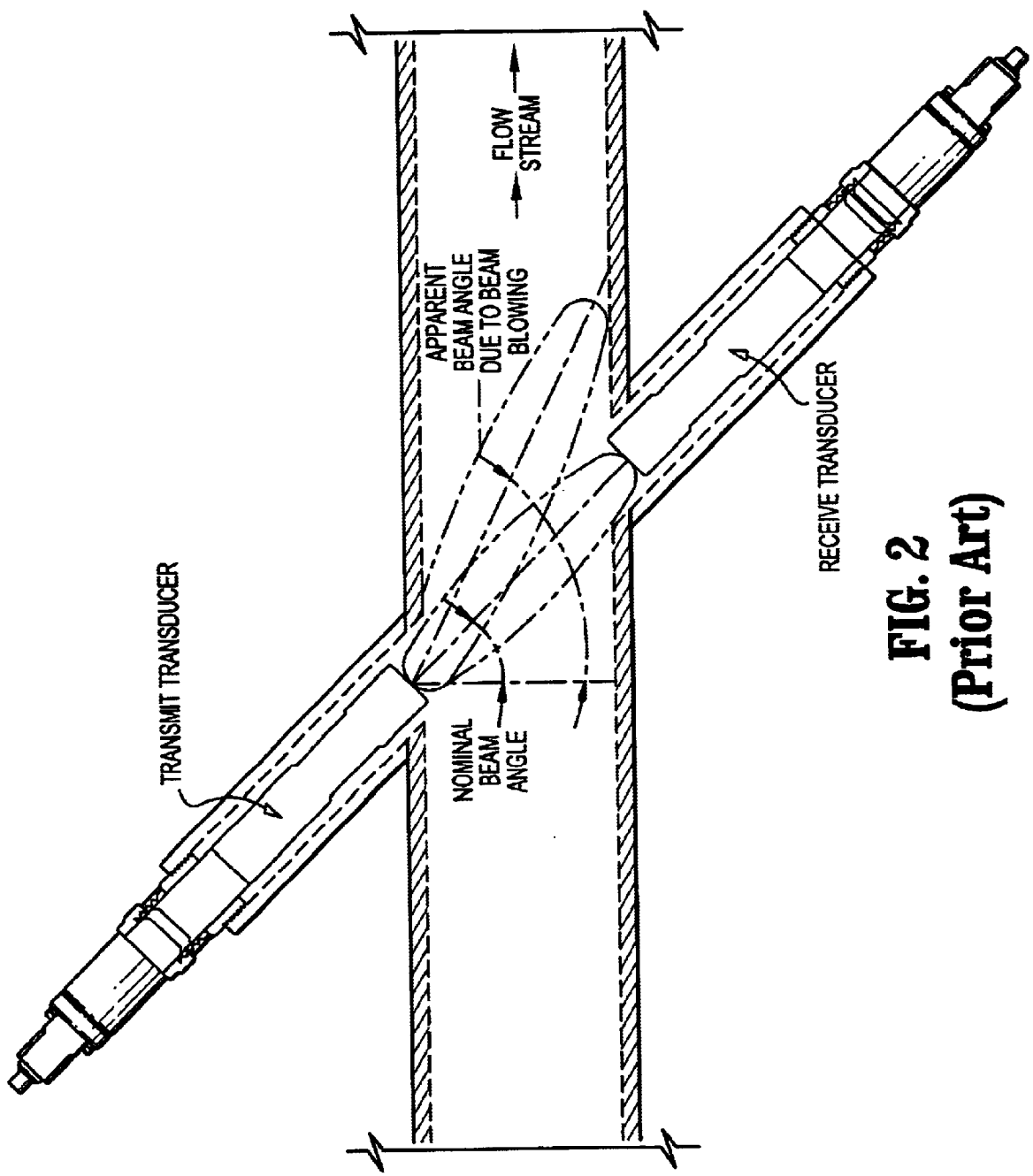
FIG. 2 shows the blowing effect on a narrow beam in the path of gas flow.
Figure 3:
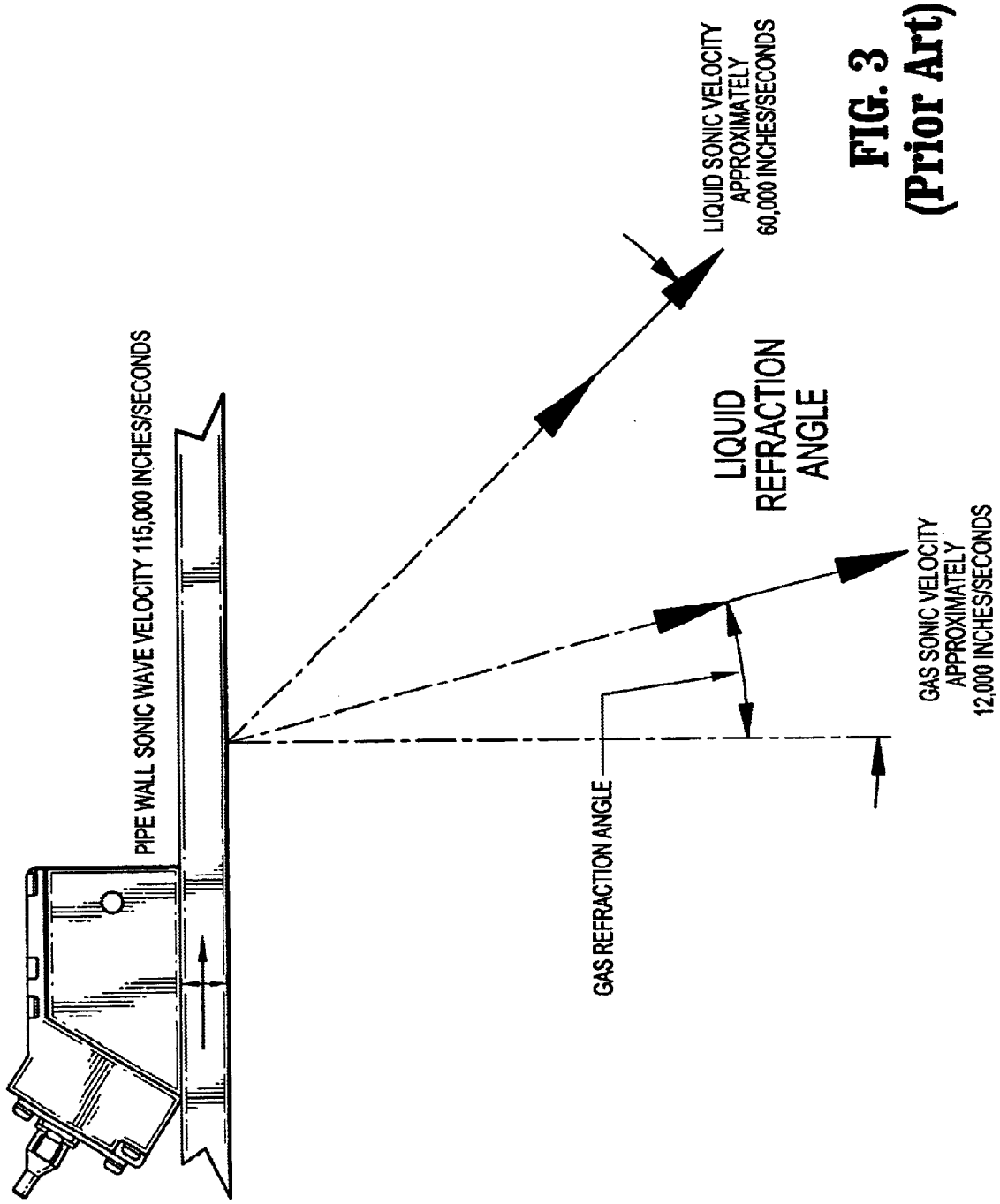
FIG. 3 illustrates the differences in refraction angles for gas and liquids.
Figure 4C:
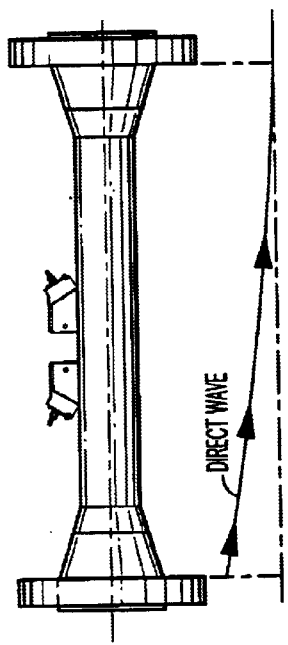
FIG. 4C shows reflection characteristics of noise amplitude versus time of a direct wave.
Figure 4D:
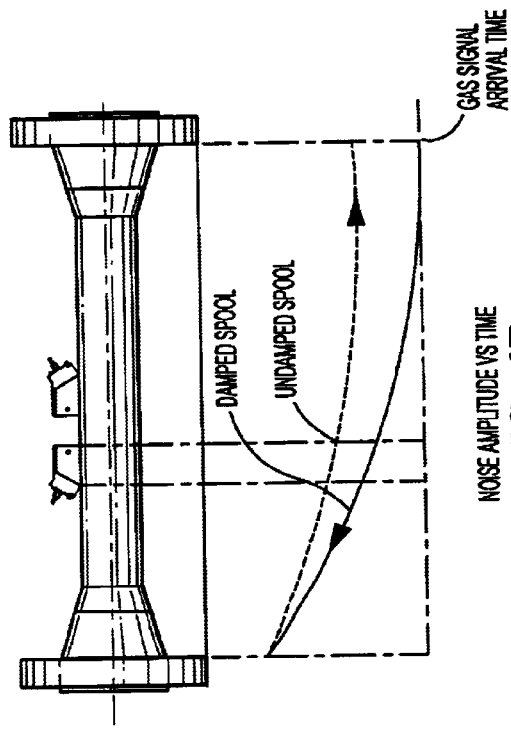
FIG. 4D shows reflection characteristics of noise amplitude versus time of an undamped and a damped spool.
Figure 4A:
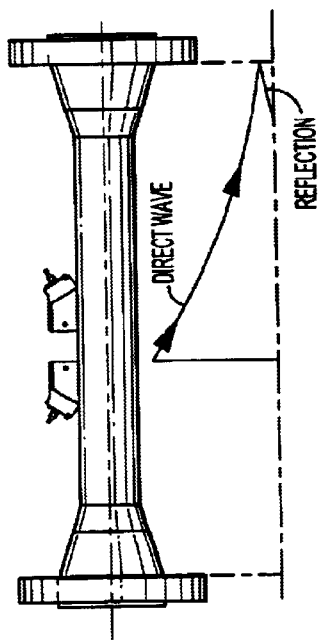
FIG. 4A shows reflection characteristics of noise amplitude versus distance of a direct wave in a spool.
Figure 4B:
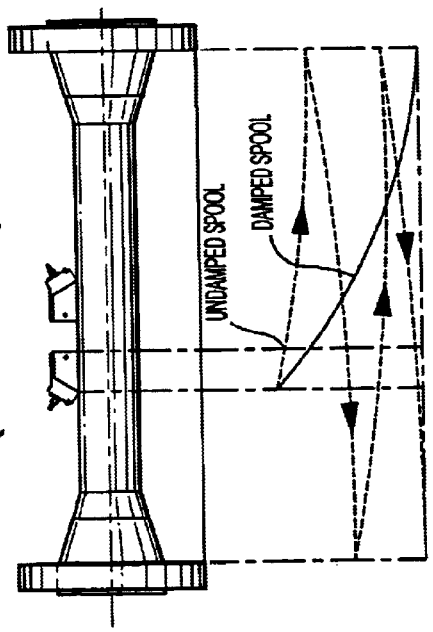
FIG. 4B shows reflection characteristics of undamped and a damped spool.
Figure 5:
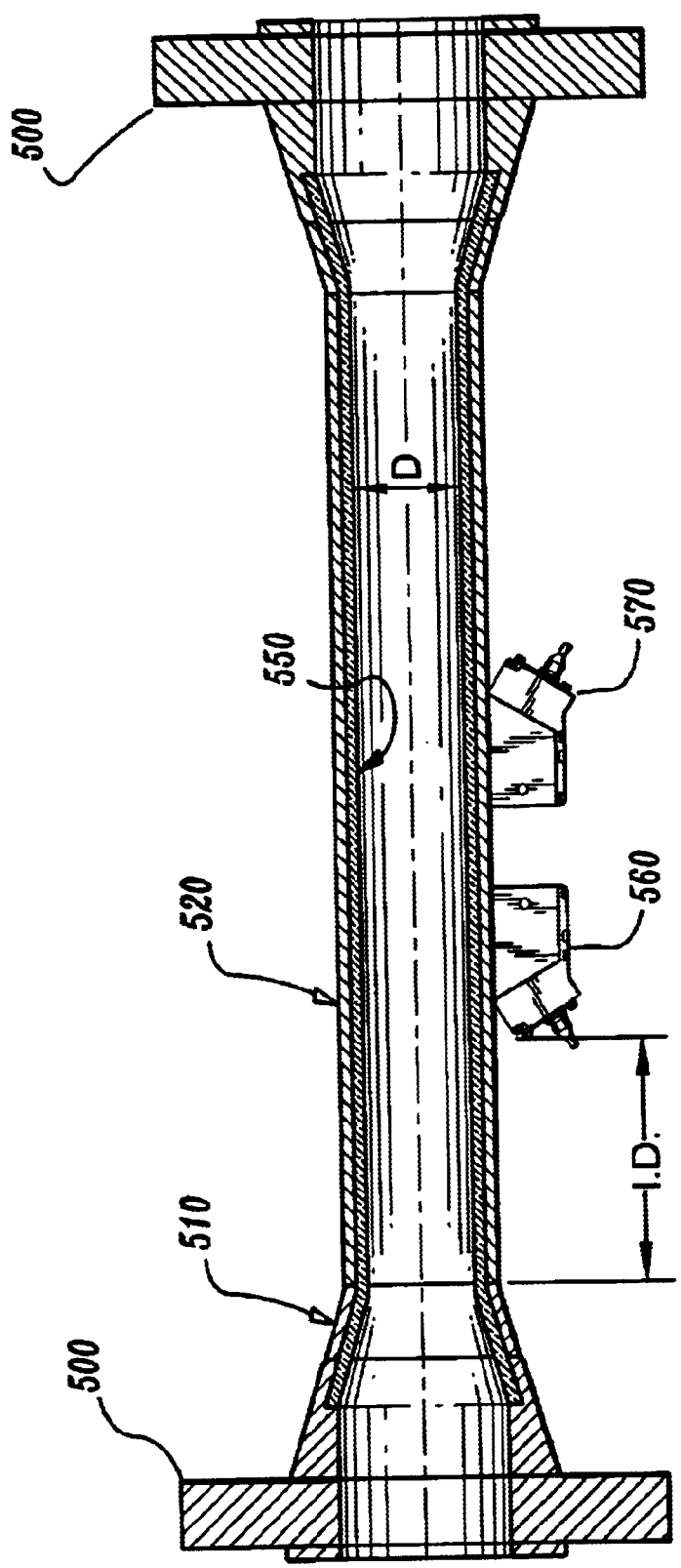
FIG. 5 is a cross-sectional view of a flowmeter device according to a preferred embodiment of the present invention.

FIG. 5 shows a clamp-on gas spool for use as a gas flowmeter according to a preferred embodiment of the present invention. The spool includes flanges 500, reducer 510 with precision machined pipe wall 520, on which is mounted transmit and receive transducers 560 and 570. According to this embodiment, liner 550 is bonded to the inside of the pipe wall 520. Materials suitable for the liner 550 should be viscous and have the ability to bond intimately to the pipe wall. Preferably, plastics including Tefzel, Polypropylene, and certain grades of Polyethylene is used. An intimate bonding is accomplished by melting the plastic onto the surface of the pipe, and by controlling the temperature decline slowly, while moving the assembly to assure a reasonably uniform thickness when cooled.

Advantageously, it is found that the sonic impedance of the plastics lies between the high impedance of a metal pipe wall and the much lower impedance of gas. Therefore, the plastic can not only be used to dissipate the pipe wall transmit sonic energy, but also serves to improve the "impedance match" by being placed between the pipe wall and the gas, resulting in a greater amount of the available transmit sonic energy entering the gas itself, thereby substantially improving the signal to noise ratio.

It can be seen that the aspect of the present invention directed to matching the sonic impedance of the pipe and the flowmeter is applicable to gas flow through a plastic pipe section. In such embodiment, use of plastic transducers instead of metal transducers with sonic impedance match the pipe to the transducers, without the need for a liner such as in the illustrative embodiment above wherein the flowmeter is clamped onto metallic pipe.

It is noted that at the wide beam transducer frequencies demanded by the pipe wall thickness' and materials used for high pressure gas transmission, variation in the thickness of an internal pipe wall plastic coating may result in alternate reinforcement and cancellation of the sonic beam as it reflects between the inner surface of the pipe wall, and the liner 550 to gas interface surface. A solution according to a preferred embodiment of the invention is to machine the thickness of the liner 550 so that it reflects uniformly in-phase with the pipe wall sonic energy as it travels down the pipe wall. This is much like the action required in reinforcing the amplitude of a swing by pushing it at just the right time in its trajectory (See FIG. 6).

Figure 6:
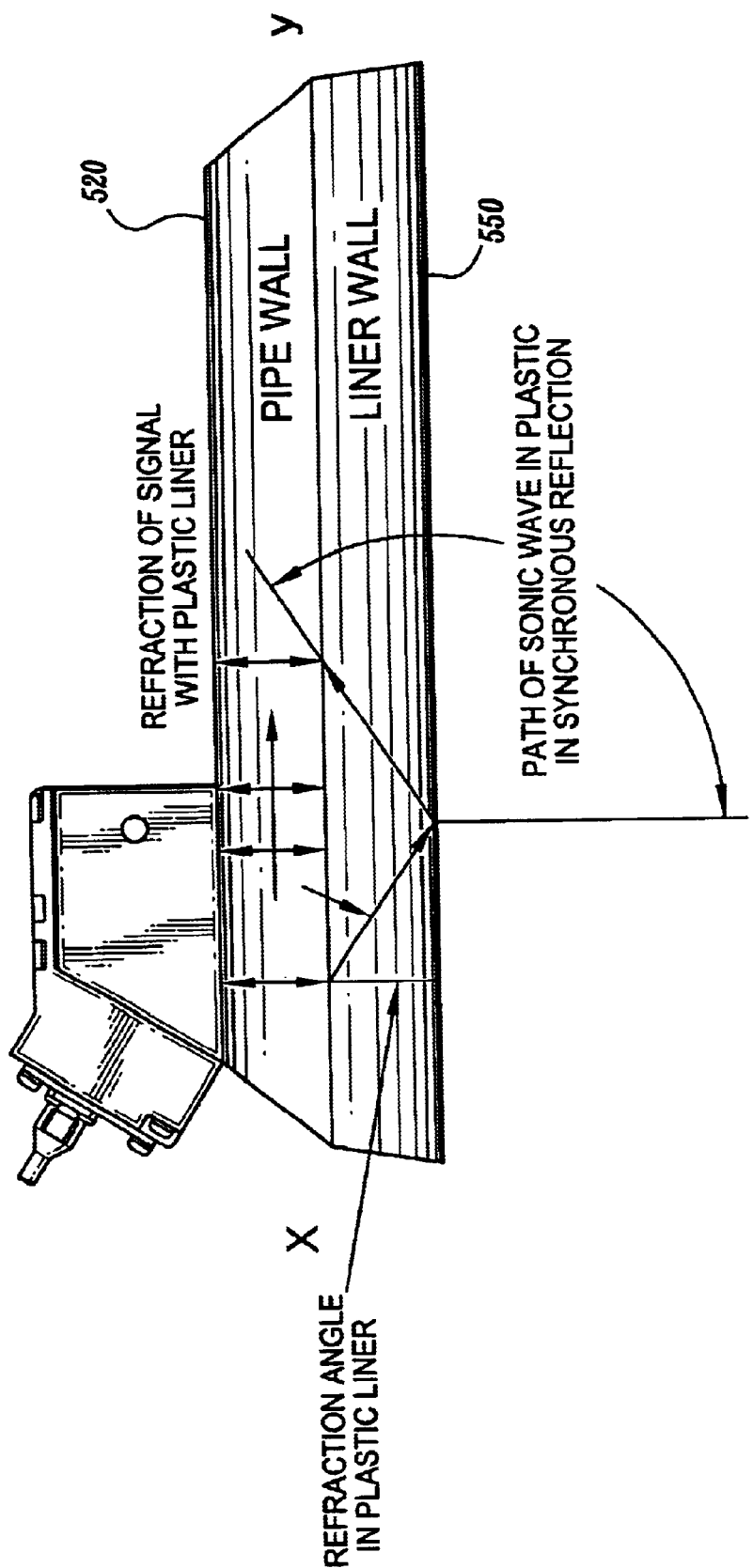
FIG. 6 illustrates a section of the spool having the liner and the sonic wave as it travels down the spool.

FIG. 6 illustrates a section of the spool having the liner and the sonic wave as it travels down the spool. It can be seen that as the sonic wave travels from X down toward Y, the liner is at a thickness and a refraction angle that the refracted sonic wave from the pipe wall 520 is reflected in liner 550 onto the pipe wall 520 in the same direction of travel as the sonic wave.

Figure 7:
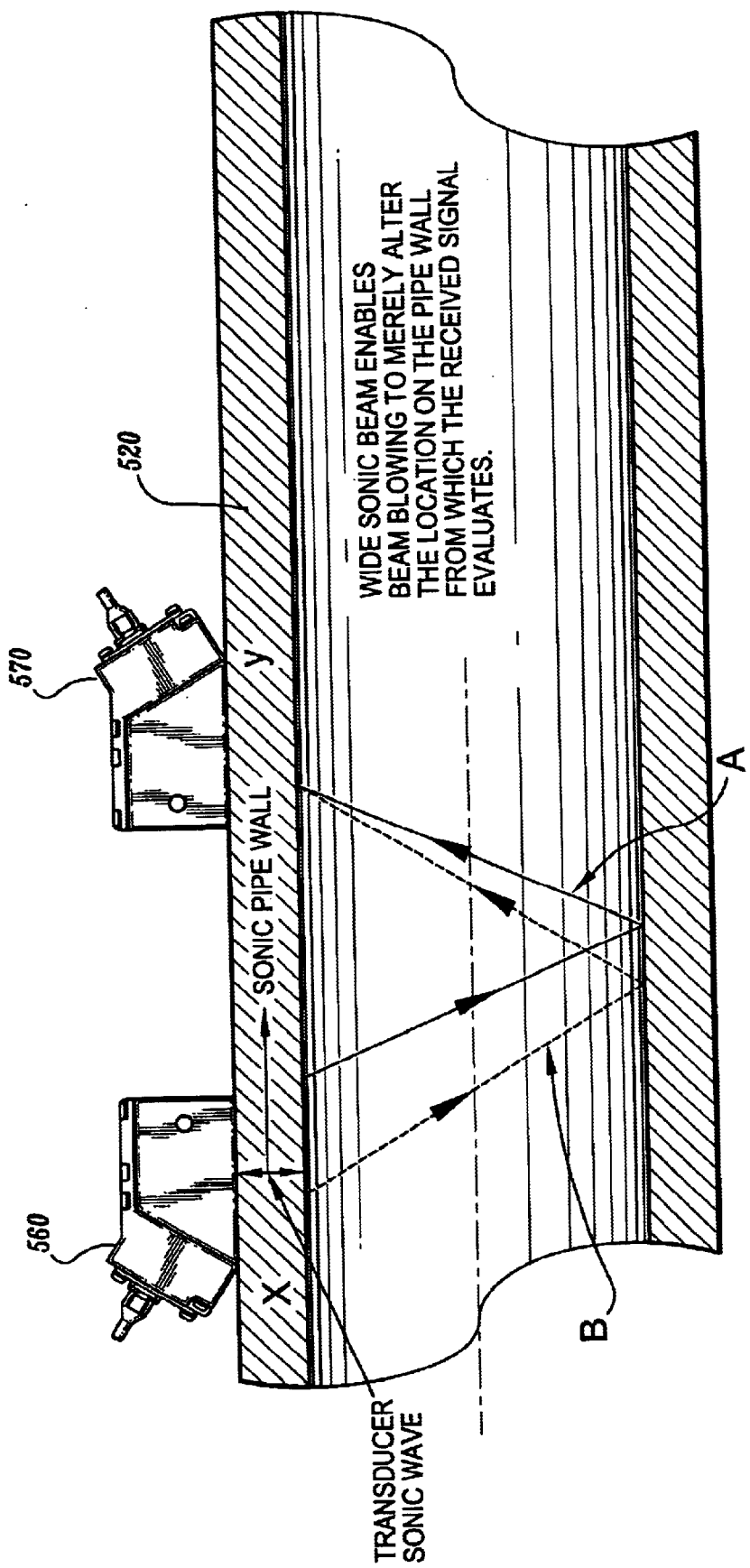
FIGS. 7 and 8 shows the beam path characteristics as it is injected from a transmit transducer through the device of FIG. 5.

As the sonic energy thus created in the pipe wall travels towards the receive transducer, it forms a wide beam, wherein sonic energy is emitted continuously along the same pipe wall, at an amplitude that represents the remaining energy left after what it previously radiated. Such wide beam can be contrasted to the very narrow beam emitted by the transmit transducer described above. Accordingly, if the beam is blown either toward or away from either transducer, there will remain some position that will serve as the emergence point as the beam is blown by high gas flow velocities. This means that the clamp-on gas transducer system, in which the energy sent into the gas is actually coming from a strip-like region between the transducers, rather than from the transducers themselves, effectively solves the beam blowing problem that afflicts the insert gas transducer system. FIG. 7 illustrates the beam path of the sonic wave as it emerges from the transmit transducer through the sonic pipe wall 520. The narrow beam travels down the sonic pipe wall 520 from X to Y and becomes a wide beam. The beam path B at high flow rate arrives at essentially the same point at the sonic pipe wall adjacent to the receiver transducer 570 as the beam path A at the low flow rate.

Another benefit of the illustrative wide beam clamp-on system according to the present invention is that by matching the pipe's sonic waveguide properties, e.g., frequency and phase velocity, the shape of the transmitted signal remains constant as the beam emergence point changes, and also even when the transmitted pipe wall signal reaches the receive transducer. Since this is well before the arrival of the gas signal (the signal through the gas), the pipe wall signal disappears well before the gas signal arrives. But since the pipe wall signal arrives only through a pipe wall path it is not affected by flow.

Figure 8:
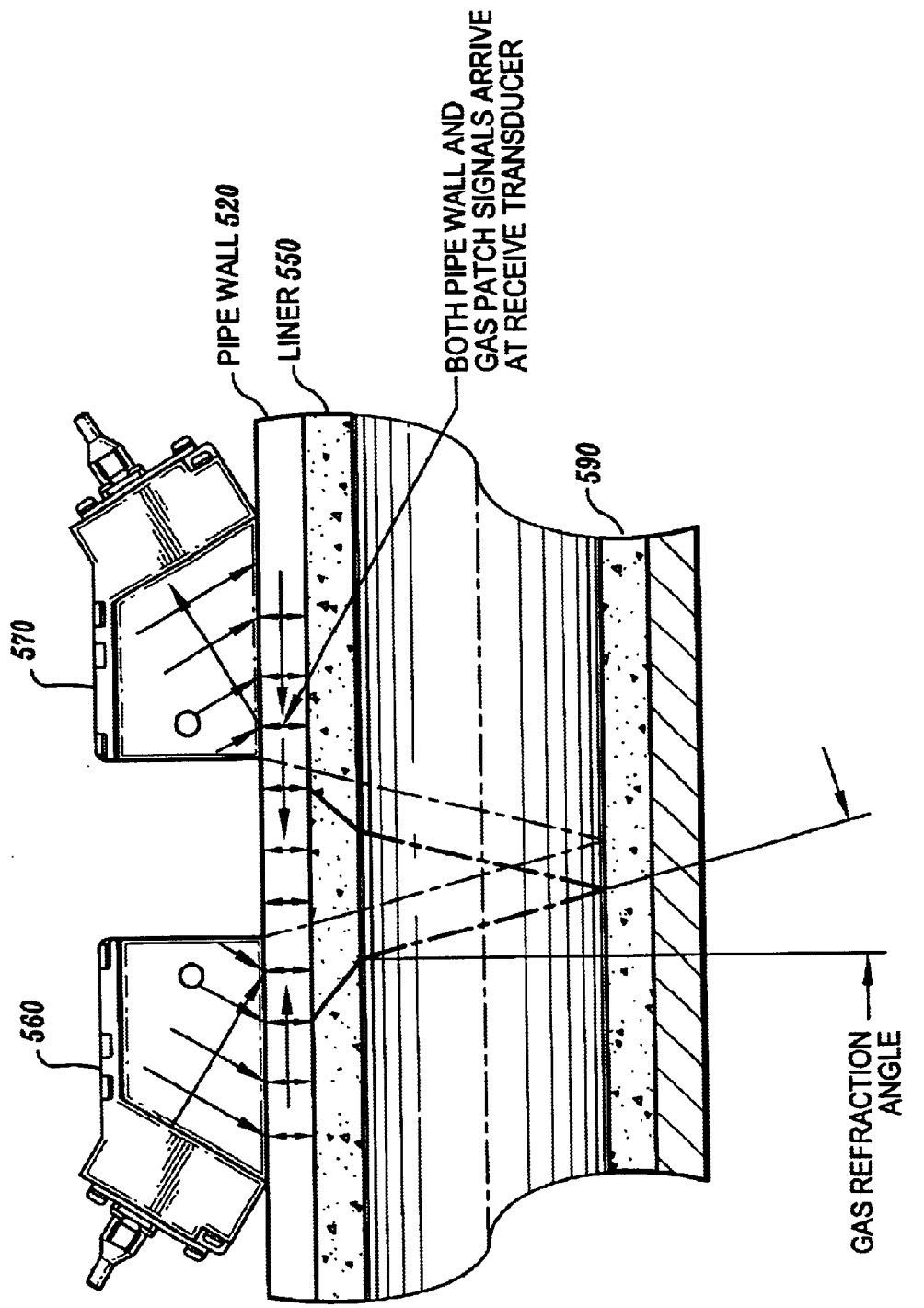

Referring to FIG. 8, sonic energy injected by transmit transducer 560 travels via pipe wall 520 toward receive transducer 570. The injected sonic energy is also refracted by liner 550, through the gas flow path within the pipe, and reflected from the liner of the opposing pipe wall 590, and arrives at the receive transducer 570 at substantially the same time as the energy via the path along the pipe wall 520. Accordingly, detecting any difference in the upstream and downstream arrival time would represent a zero flow offset that must be imprinted on the gas signals themselves. Accordingly, detecting this pipe wall signal arrival time difference and subtracting it from the gas signal arrival time will assure against any source of zero drift, and assuring high accuracy at very low flow rates.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A gas flowmeter comprising:
   a transmit transducer for injecting sonic energy into a gas;
   a receive transducer for receiving the sonic energy; and
   a spool of pipe having a metallic pipe wall and a liner having a lower sonic impedance than the sonic impedance of the metallic pipe wall, wherein the transmit and receive transducers are mounted on the spool, wherein the metallic pipe wall includes an inner and outer pipe walls, and the liner is formed on the outer pipe wall.

2. The device of claim 1, wherein the liner is made from a viscous material including one of Tefzel, polypropylene and polyethylene.

3. The device of claim 1, wherein the spool of pipe includes flanges and a reducer.

4. The device of claim 1, wherein the transmit transducer and the receive transducer is mounted along the same side of the pipe.

5. A gas flowmeter comprising:

a transmit transducer for injecting sonic energy into gas;

a receive transducer for receiving the sonic energy; and a spool of pipe having a metallic pine wall and a liner having a lower sonic impedance than the sonic impedance of the metallic pipe wall, wherein the transmit and receive transducers are mounted on the spool, and wherein the liner is bonded to the wall of the pipe by melting liner material onto the wall of the pipe declining the temperature at a given rate.

6. A gas flowmeter comprising:

a transmit transducer for injecting sonic energy into a gas;

a receive transducer for receiving the sonic energy; and a spool of pipe having a metallic pipe wall and a liner, wherein the liner is machined to a thickness to match the sonic wave guide impedance of the pipe, wherein the transmit and receive transducers are mounted on the spool, and wherein the metallic pipe wall includes an inner and outer pine walls and the liner is formed on the outer pipe wall.

7. The device of claim 6, wherein the receive transducer is spaced at a distance from the transmit transducer such that a sonic beam transmitting from the transmit transducer arrives at the receive transducer at the same time via the pipe wall and via refraction from an opposing pipe wall of the pipe.

8. A gas flowmeter comprising:

a spool of plastic pipe for carrying gas therethrough and a plastic transmit transducer and a plastic receive transducer mounted on the spool for injecting sonic energy into the path of gas flow, wherein the sonic energy is received by the receive transducer for determining velocity of gas flow.

9. A method for measuring gas flow comprising the steps of:

transmitting from a transmit transducer mounted on a metallic spool of pipe sonic energy into gas flowing through an interior of the spool of pipe; and receiving the sonic energy at a receive transducer through a liner disposed on an outer portion of the pipe wall of the spool of pipe, the liner having a lower sonic impedance than the sonic impedance of the metallic pipe wall.

10. The method of claim 10, wherein the liner is made from a plastic.

11. The method of claim 9, further including the step of spacing the transmit transducer from the receive transducer at a distance such that a sonic beam transmitted from the transmit transducer refracted by the liner, through the gas flow path within the pipe, and reflected from the opposing pipe wall arrives at the receive transducer at substantially the same time as the sonic beam via the path along the pipe wall.

12. The method of claim 9, wherein the transmit transducer and the receive transducer are mounted along the same side of the pipe.

13. A method for measuring gas flow comprising the steps of:

transmitting from a transmit transducer mounted on a metallic spool of pipe sonic energy into gas flowing through an interior of the spool of pipe; and receiving the sonic energy at a receive transducer mounted on the metallic spool through a liner disposed on an outer portion of the pipe wall of the spool of pipe, the liner having a lower sonic impedance than the sonic impedance of the metallic pipe wall, and wherein the liner is bonded to the wall of the pipe by melting liner material onto the wall of the pipe and continually declining the temperature at a given rate.

14. A method for measuring gas flow comprising the steps of:

transmitting from a transmit transducer mounted on a metallic spool of pipe sonic energy into gas flowing through an interior of the spool of pipe; and receiving the sonic energy at a receive transducer through a liner disposed on an outer portion of the pipe wall of the spool of pipe, wherein the liner is machined to a thickness to match the sonic wave guide properties of the pipe.

15. A gas flowmeter device for measuring gas flow by injecting and receiving sonic energy through the path of gas flow, comprising:

a spool of pipe for passing gas flow therethrough; and interface means disposed on an outer portion of the pipewall of the spool for sonic impedance matching materials in the path of the sonic energy.

16. The device of claim 15, wherein the interface means includes a liner having a lower sonic impedance than the sonic impedance of the pipewall.

17. The device of claim 16, wherein the spool of pipe is metallic.

18. The device of claim 15, wherein the interface means includes a plastic transmit transducer for injecting the sonic energy and a plastic receive transducer for receiving the sonic energy, and the spool of pipe is plastic.

* * * * *